United States Patent
Lu et al.

(10) Patent No.: US 9,148,415 B2
(45) Date of Patent: Sep. 29, 2015

(54) METHOD AND SYSTEM FOR ACCESSING E-BOOK DATA

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 383 days.

(21) Appl. No.: 13/806,336

(22) PCT Filed: Apr. 27, 2012

(86) PCT No.: PCT/CN2012/074794
§ 371 (c)(1),
(2), (4) Date: Dec. 21, 2012

(87) PCT Pub. No.: WO2012/152191
PCT Pub. Date: Nov. 15, 2012

(65) Prior Publication Data
US 2013/0097419 A1    Apr. 18, 2013

(30) Foreign Application Priority Data

May 9, 2011    (CN) .......................... 2011 1 0118869

(51) Int. Cl.
*H04L 29/06* (2006.01)
*H04L 9/08* (2006.01)

(52) U.S. Cl.
CPC *H04L 63/08* (2013.01); *H04L 9/08* (2013.01); *H04L 63/0435* (2013.01); *H04L 2463/103* (2013.01)

(58) Field of Classification Search
CPC .................................................. H04L 63/0823
See application file for complete search history.

(56) References Cited

U.S. PATENT DOCUMENTS

| | | |
|---|---|---|
| 7,861,312 B2 * | 12/2010 | Lee et al. ......................... 726/27 |
| 2006/0010500 A1 * | 1/2006 | Elazar et al. .................... 726/27 |
| 2007/0055631 A1 * | 3/2007 | Li ................................... 705/57 |
| 2011/0032227 A1 | 2/2011 | Miyaguchi |

* cited by examiner

*Primary Examiner* — Teshome Hailu
*Assistant Examiner* — Thanh Le
(74) *Attorney, Agent, or Firm* — Hammer & Associates, P.C.

(57) ABSTRACT

Provided is a method for accessing e-book data, including: step A: e-book hardware establishes a connection with an electronic device and negotiates a reading key; step B: the electronic device downloads e-book data via a client, specifically is: firstly, the electric device establishes a connection with the client; the client sends a connection establishment request to a server; the server verifies the identification of the electronic device via the client; if the verification is not passed, then the access will be refused; if the verification is passed, then the server uses a downloaded key to encrypt the e-book data and sends the encrypted e-book data to the electronic device via the client; and step C: the electronic hardware establishes a connection with the electronic device, processes the encrypted e-book data using the downloaded key and/or the reading key, and the e-book hardware displays the e-book data. The method provided in the present embodiment not only enables the download and reading of the e-book to be more rapid but also protects the copyright of the e-book.

20 Claims, 2 Drawing Sheets

METHOD AND SYSTEM FOR ACCESSING E-BOOK DATA

TECHNICAL FIELD

The invention relates to the information security field and in particularly, relates to a method for accessing or accessing to e-book data and a system therefor.

PRIOR ART

The traditional book is big in size, not convenient for carrying away and collecting, and thus a new type of reading way, e-book, emerges, which displays contents of a book by pages on a screen of an electronic device platform, such as a computer, a palm computer, a PDA, and an e-book reader, etc. By this reading way, the e-book is stored on an electronic device platform in the form of electronic files and therefore it is convenient for long-term collection and managing, and a user of the e-book only needs to take with one palm computer, a PDA, or a reading software corresponding to an e-book reader when being outside, and reads the e-book by inserting a memory card which stores the e-book data, which is quick and convenient.

For adding new content to an e-book, the e-book is commonly downloaded from the internet, and a user of it needs to connect to the internet personally, explore the server website for downloading the e-book and download the e-book data as required. However, more and more private books emerge in the market, and with rapid development of internet, copyright problem of the e-book is paid more attention. Due to the rapid spread and mass users of the internet, the copyright infringement of the e-book happens frequently, the copyright protection of the e-book is listed in schedule to be solved. Finding out features of infringement behaviors of the e-book and being active in providing a solution are very important for a publishing corporation to do the digital publishing bus line continuously and validly.

SUMMARY OF THE INVENTION

In order to solve the problems in the prior art, the invention provides a method for accessing to e-book data and a system therefor, which not only accelerate and simplify downloading and reading of the e-book, but also protect copyright of the e-book.

The invention provides a method for accessing e-book data, comprising that:

Step A. an e-book hardware establishes a connection with an electronic device, and consults with the electronic device for a reading key, in which the electronic device is a device with an interface compatible with a SD card, functions of encryption and decryption, and function of storage;

Step B. the electronic device downloads the e-book data through a client side, which specifically comprises that firstly, the electronic device establishes a connection with the client side;

the client side sends a request for establishing a connection to the server; and the server authenticates identity of the electronic device through the client side, and refuses the access in case of failed authentication, otherwise encrypts the e-book data with a downloading key and sends the encrypted e-book data to the electronic device through the client side; and Step C. the e-book hardware establishes the connection with the electronic device, processes the encrypted e-book data with the downloading key and/or with the reading key, and the e-book hardware displays the e-book data;

in which Step A can be executed after Step B.

That the electronic hardware consults with the electronic device for a reading key comprises that the e-book hardware generates the reading key and sends the reading key to the electronic device, or the electronic device generates the reading key and sends the reading key and/or a hardware serial number of the electronic device to the e-book hardware, in which the reading key is a symmetrical key or an unsymmetrical key, and the key being sent is a public part of the unsymmetrical key in case that the reading key is an unsymmetrical key.

That the e-book hardware generates a reading key comprises two ways: pre-setting the reading key or pre-generating the reading key; that the electronic device generates a reading key comprises pre-setting the reading key or pre-generating the reading key; the reading key is a symmetric key; and that the e-book hardware generates a reading key comprises that the e-book hardware pre-generates a random number as the symmetric key.

That the e-book hardware or the electronic device generates a reading key comprises that the e-book hardware or the electronic device generates a random number as the symmetric key or the unsymmetrical key when the e-book hardware is connected to the electronic device.

The consulting on a downloading key comprises that the electronic device presets or randomly pre-generates a symmetric downloading key, and the electronic device downloads the e-book directly through the client side when first downloading the e-book, and sends the downloaded key to the server for storing through the client side; or the electronic device presets a symmetric downloading key, and the server pre-stores a corresponding copy of the symmetric key;

that the server authenticates the identity of the electronic device through the client side is processed by a way of Impulse Response which comprises that the server generates a challenge code, and sends the challenge code to the electronic device through the client side;

upon receiving the challenge code, the electronic device encrypts the challenge code with the downloading key or with the copy of the downloading key, takes the encrypted result as response data, and sends the response data back to the server through the client side;

the server encrypts the challenge code with the downloading key so as to obtain the authentication data, compares the authentication data with the response data returned by the electronic device, and determines whether they are identical; and that the server sends the e-book data being encrypted with the downloading key to the electronic device through the client side comprises that the server encrypts the e-book data being requested for downloading with the downloading key being stored or the copy of the downloading key so as to form a first encrypted data of the e-book, and sends the first encrypted data to the electronic device through the client side, and the electronic device stores the first encrypted data; and the electronic device consults with the e-book hardware for a reading key before downloading the e-book data through the client side, decrypts the first encrypted data with the corresponding downloading key and generates a second plaintext data; encrypts the second plaintext data with the symmetric reading key, the private part of the reading key, or the public part of the reading key, so as to obtain a second encrypted data and stores the second encrypted data.

The consulting for a downloading key comprises that the electronic device presets an unsymmetrical downloading key and personally stores the private part of the downloading key, and the server pre-stores a public part copy of the downloading key which matches with the private part of the downloading key, or the electronic device sends the public part of the downloading key to the server for storing when downloading the e-book through the client side for the first time.

That the server authenticates the identity of the electronic device through the client side comprises that the server generates a random number upon receiving the request for establishing a connection being sent by the electronic device, takes the random number as a random key and sends the random key to the electronic device;

the electronic device signs the random key being received with the private part of the downloading key, takes the signature result as the authentication data and returns the authentication data to the server through the client side;

the server verifies whether the authentication data is a correct signature with the public part of the downloading key being stored or a copy of the public part of the downloading key and the random number being generated; and that the server sends the e-book data being encrypted with the downloading key to the electronic device through the client side comprises that the server encrypts the e-book data being requested for downloading with the public part of the downloading key being stored, or a copy of the public part of the downloading key, forms the first encrypted data of the e-book and sends the first encrypted data to the electronic device through the client side, and the electronic device stores the first encrypted data; and the electronic device consults with the e-book for a reading key before downloading the e-book data through the client side, decrypts the first encrypted data with the private part of the downloading key so as to obtain the second plaintext data, encrypts the second plaintext data with the symmetrical reading key, the private part of the reading private key, or the public part of the reading key, so as to obtain the second encrypted data and stores the second encrypted data.

That the server sends the e-book data being encrypted with the downloading key through the client side to the electronic device comprises that the server generates a random number as a symmetrical session key, and encrypts the e-book data being requested for downloading with the session key, so as to form the first encrypted data of the e-book;

the server encrypts the session key with the public part of the downloading key or the copy of the public part of the downloading key, so as to form an encrypted session key;

the server sends the first encrypted data and the encrypted session key to the electronic device through the client side; and the electronic device stores the first encrypted data being received and the session key being encrypted.

The session key comprises an e-book record number and a downloading time; an e-book record number and a number of downloading times; a hash value of the e-book record number and the downloading time; or a hash value of the e-book record number and the number of downloading times.

The electronic device consults with the e-book hardware for a reading key before downloading the e-book data through the client side, decrypts the encrypted session key with the private part of the corresponding downloading key so as to obtain the session key, and decrypts the first encrypted data being received with the obtained session key so as to obtain the second plaintext data; and the electronic device encrypts the second plaintext data with the symmetrical reading key, the private part of the reading key, or the public part of the reading key so as to obtain second encrypted data, and stores the second encrypted data.

Said Step C comprises that the e-book hardware sends a request for accessing e-book data to the electronic device, and the electronic device responses to the request and sends the second encrypted data to the e-book hardware; or sends the second encrypted data to the e-book hardware directly without a response to the request; and the e-book hardware decrypts the second encrypted data with the reading key being consulted for at the time of establishing the connection with the electronic device, and displays the decryption result.

The e-book hardware presets a plurality of reading keys, and said Step A comprises that the e-book hardware establishes a connection with the electronic device, selects an unused reading key from the plurality of reading keys and sends the same to the electronic device, then reads and stores the hardware serial number of the electronic device, in which the reading key being sent to the electronic device is one-by-one correspondence to the hardware serial number of the electronic device; and correspondingly, said Step C comprises that the e-book hardware sends a request for accessing to the e-book data to the electronic device, and the electronic device responses to the request, and the e-book hardware reads directly the hardware serial number of the electronic device upon receiving the response, compares the read hardware serial number of the electronic device with the hardware serial number being stored at the time of consulting for the reading key, and determines whether a match is found, if no, the access is failed;

if yes, the e-book hardware sends the determination result to the electronic device, and the electronic device sends the second encrypted data to the e-book hardware upon receiving the determination result, and the e-book hardware obtains the reading key corresponding to the hardware serial number being stored at the time of binding, decrypts the second encrypted data being received with the reading key, so as to obtain the second plaintext data, and outputs the second plaintext data to a display for displaying.

The e-book hardware presets a plurality of reading keys, and said Step A comprises that the e-book hardware establishes a connection with the electronic device, selects an unused reading key from the plurality reading keys, sends the reading key being selected to the electronic device, then reads and stores the hardware serial number of the electronic device, in which the reading key being sent to the electronic device is one-by-one correspondence to the hardware serial number of the electronic device; and correspondingly, said Step C comprises that the e-book hardware sends a request for accessing the e-book data to the electronic device and the hardware serial number being stored at the time of consulting for the reading key, and the electronic device determines whether the hardware serial number being sent by the e-book hardware is identical to the hardware serial number of itself, if yes, the electronic device responses to the request, decrypts the second encrypted data being stored with the reading key so as to obtain second plaintext data and sends the second plaintext data to the e-book hardware, and the e-book hardware receives and outputs the second plaintext data to a display for displaying; if no, the access is refused.

Said Step C comprises that the e-book hardware sends a request for accessing to e-book data to the electronic device, and the electronic device responses to the request and sends the first encrypted data to the e-book hardware; or directly sends the first encrypted data to the e-book hardware; and the e-book hardware decrypts the first encrypted data with the reading key being stored.

The e-book hardware presets a plurality of reading keys, and said Step A comprises that the e-book hardware establishes the connection with the electronic device, selects an unused reading key from the plurality reading keys, sends the reading key being selected to the electronic device, reads and stores the hardware serial number of the electronic device, in which the reading key being sent to the electronic device is one-by-one correspondence to the hardware serial number of the electronic device; and correspondingly, said Step C comprises that the e-book hardware sends a request for accessing to e-book data and a hardware serial number being stored by itself to the electronic device, and the electronic device determines whether the hardware serial number of itself is identical to the hardware serial number being sent by the e-book hardware, if yes, the electronic device responses to the request and decrypts the first encrypted data with the private part of the reading key identical to the hardware serial number; or directly decrypts the first encrypted data with the private part of the reading key identical to the hardware serial number without a response;

if no, the access is failed.

The e-book hardware presets a plurality of reading keys, and said Step A comprises that the e-book hardware establishes a connection with the electronic device, selects an unused reading key from the plurality reading keys, sends the reading key being selected to the electronic device, then reads and stores the hardware serial number of the electronic device, in which the reading key being sent to the electronic device is one-by-one correspondence to the hardware serial number of the electronic device; and correspondingly, said Step C comprises that the e-book hardware sends a request for accessing to e-book data and a hardware serial number being stored by itself to the electronic device, determines whether the hardware serial number of itself is identical to the hardware serial number being sent by the e-book hardware, if yes, the electronic device responses to the request and decrypts the encrypted session key with the private part of the reading key which is identical to the hardware serial number, so as to obtain the session key, and decrypts the first encrypted data with the session key so as to obtain the e-book data;

if no, the access is failed.

A system of accessing to e-book data, comprising a server, a client side, and an e-book hardware, wherein said system further comprises an e-book device, the server comprises a first receiving module for receiving a downloading key being sent by a second sending module;

a first storing module for storing the e-book data and the downloading key;

a first authenticating module for authenticating the identity of the electronic device which is inserted into the client side which communicates with it;

a first executing module for encrypting the e-book data being stored with the downloading key in the first storing module so as to form first encrypted data;

a first sending module for sending the first encrypted data to the electronic device;

a first bus line module for connecting all hardware modules in the server;

the client side is provided for connecting to the electronic device and communicating with the server; and the electronic device is with an interface compatible with a SD card, and means for having functions of encryption, decryption and storage, and the electronic device comprises a second interface module for connecting the electronic device respectively to the client side and the e-book hardware;

a second receiving module for receiving and storing the first encrypted data being sent by the first sending module and for receiving the reading key being sent by the third sending module;

a second generating module for generating the downloading key and/or the reading key which is/are symmetrical key or unsymmetrical key;

a second executing module for decrypting the first encrypted data being received by the second receiving module and encrypting the decrypted data with the reading key in the second generating module so as to form second encrypted data;

a second storing module for storing the second encrypted data being generated by the second executing module or the first encrypted data being received by the second receiving module, and for storing the reading key being sent by the e-book hardware;

a second decrypting module for decrypting the encrypted data in the second storing module to obtain plaintext data of the e-book;

a second sending module for sending the plaintext data in the second decrypting module or the encrypted data in the second storing module to the e-book hardware, for sending the reading key in the second generating module to the e-book hardware and for sending the downloading key in the second generating module to the first receiving module through the client side; and a second bus line module for connecting all the hardware modules in the electronic device; and the e-book hardware comprises a third interface module for connecting the electronic device to the e-book hardware and for connecting the third interface module to the second interface module;

a third accessing module for sending a request for accessing the e-book data to the electronic device and being connected to the second decrypting module;

a third receiving module for receiving the plaintext data or the encrypted data being sent by the second sending module and for receiving the reading key being sent by the second sending module;

a third generating module for generating a symmetrical reading key or an unsymmetrical reading key;

a third storing module for storing the reading key being received by the third receiving module or for storing the reading key being generated by the third generating module;

a third sending module for sending the reading key being generated by the third generating module to the second receiving module;

a third executing module for decrypting the encrypted data in the third receiving module with the reading key in the third storing module so as to obtain the plaintext data; and a third bus line module for connecting all modules in the e-book hardware.

The server comprises a first generating module for generating and sending a challenge code to the electronic device;

the second executing module is used for encrypting the challenge code with the downloading key being generated by the second generating module and returning the encrypted result as response data to the first authenticating module; and the first authenticating module encrypts the challenge code with the downloading key in the first storing module so as to obtain authentication data and compares the authentication data with the response data being returned by the second executing module and determines whether a match is found.

The server comprises a first generating module for generating a random number, taking the random number as a session key and sending the session key to the second executing module;

the second executing module is for signing the random key being received with the private part of the downloading key being generated by the second generating module, taking the signature result as the authentication data, and returning the authentication data to the first authenticating module of the server;

the first authenticating module of the server authenticates whether the authentication data is a correct signature with the public part of the downloading key and the random number in the first storing module; and the session key comprises an e-book record number and a downloading time; the e-book record number and a number of downloading times; a hash value of the e-book record number and the downloading time; or a hash value of the e-book record number and the number of downloading times.

The server comprises a first generating module for generating a random number as the symmetrical session key;

the first executing module is used for encrypting the e-book data with the session key so as to form first encrypted data and for encrypting the session key with the public part of the downloading key so as to form encrypted session key;

the first sending module is used for sending the first encrypted data and the encrypted session key to the second receiving module; and the second executing module is used for decrypting the first encrypted data being received by the second receiving module and for encrypting the decrypted data with the reading key in the second generating module so as to form the second encrypted data, which specifically comprises that the second executing module uses the downloading key being generated by the second generating module to decrypt the encrypted session key being received by the second receiving module so as to obtain the session key and uses the session key being obtained to decrypt the first encrypted data in the second receiving module so as to obtain the second plaintext data, and uses the reading key being generated by the second generating module or the reading key being received by the second receiving module to encrypt the second plaintext data so as to obtain the second encrypted data.

The reading key being generated by the third generating module is preset or generated randomly, and the reading key is a symmetrical or an unsymmetrical key.

The third accessing module is used for reading the hardware serial number of the electronic device.

The invention is realized by steps that a SD Key submits a request for downloading e-book data through a client side to a server and stores the e-book data downloaded, the e-book hardware cannot be accessed to unless the e-book is binding to the SD Key validly before accessing to the e-book data, otherwise the e-book is forbidden to be accessed to, and the e-book data is stored in the SD Key. The invention increases security of the e-book data, accelerates and simplifies downloading and reading of the e-book, and protects the copyright of the e-book.

DESCRIPTION OF THE DRAWINGS OF THE INVENTION

BEST MODES FOR CARRYING OUT THE INVENTION

The embodiments provide a method for accessing e-book data and a system therefor, which involves in a server 10, a client side 20, a SD Key 30, and an e-book hardware 40. For clarifying the summary of the invention, a detail description is given in accompany with the embodiments and the drawings, but it is not a limit to the invention.

Embodiment 1

Figure 1:
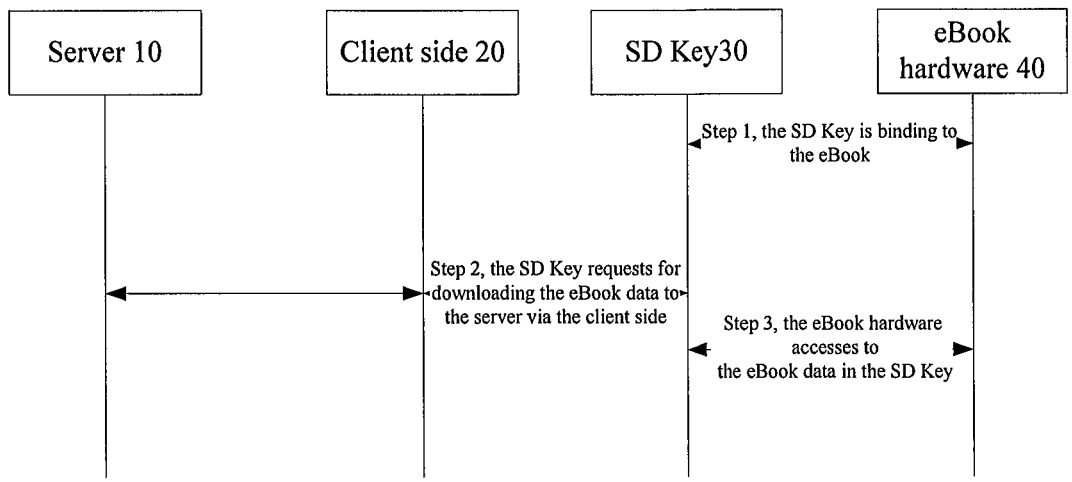
FIG. 1 illustrates a flow chart of a method for accessing to e-book data provided by the present embodiment.

As illustrated in FIG. 1, the flow chart of the method for accessing (accessing to) e-book data provided by Embodiment 1 are illustrated as follows.

Step 1, an e-book hardware is binding to a SD Key;

Preferably, the SD Key is an information security device with a standard SD card interface, having functions of encryption, decryption, and storage, and it accesses an encryption lock via its API interface. The encryption hardware supports 512/1024/2048 bits of algorithm, such as RSA, DES, 3DES, SHAT, HMAC, and MD5, etc. The device being compatible with a SD card interface includes TF card, MMC card, and MINI-MMC card, etc.

In the embodiment 1, the SD Key will not make data communication unless it is binding with the e-book.

Specifically, the e-book hardware connects with the SD Key and the binding step includes that the e-book hardware sends a key to the SD Key; or the SD Key sends a key, or a key and an SD Key hardware serial number to the e-book hardware; or the SD Key sends a key to the e-book hardware and the e-book hardware reads the SD Key hardware serial number. The binding step ensures the e-book data in the SD Key to be accessed normally by the e-book hardware.

It is noted that the key is a reading key which may be a symmetrical key or an unsymmetrical key, and what is sent in the binding step is a symmetric reading key or a public part of the reading key, and the private part of the reading key is stored in the SD Key or in the e-book hardware, which cannot be exported.

Step 2, the SD Key requests for downloading the e-book data to the server through the client side.

Specifically, the SD Key connects with the client side host.

Preferably, the client side receives the request for downloading the e-book data being sent by a user, responses to the request and sends the request for downloading the e-book data to the server, and establishes a connection with the server.

The client side referred to the embodiment is used for connection and communication between the SD Key and the server, which can be a user PC computer, a netbook, a browser capable of connecting to a network, an e-book, or a mobile phone capable of connecting to a network.

The server authenticates the SD Key through the client side and determines whether the authentication is successful, if yes, the server sends first encrypted data being obtained by encrypting the e-book plaintext data, to the SD Key through the client side, and the SD Key stores the first encrypted data being received; or the server sends the first encrypted data to the SD Key through the client side and the SD Key decrypts the first encrypted data being received with a downloading key which is stored and matched with the key being used at the time that the server encrypts the e-book data so as to obtain second plaintext data, and encrypts the plaintext data with the reading key being stored to obtain and store the second encrypted data;

if no, the server refuses the request of the client side.

It is noted that the downloading step includes that the e-book plaintext data is encrypted with the downloading key to obtain the encrypted e-book data, and if the downloading key is a symmetric key, the e-book plaintext data is encrypted with the symmetric key to obtain the encrypted e-book data; or if the downloading key is an unsymmetrical key, the plaintext e-book data is encrypted with the public part of the unsymmetrical key so as to form the encrypted e-book data.

Step 3, the e-book hardware accesses to the e-book data in the SD Key.

Specifically, the e-book hardware connects with the SD Key, decrypts the e-book data being stored in the SD Key with the symmetrical key or with the public part of the unsymmetrical key or with the private part of the unsymmetrical key.

In case of a matched key, the decryption is successful and the e-book data is displayed normally; or in case of an unmatched key, the decryption is failed and the e-book data is not displayed normally.

Or the SD Key decrypts the encrypted e-book data with its symmetrical key or the private part of the unsymmetrical key so as to obtain the plaintext data, and sends the plaintext data to the e-book hardware, and the e-book hardware displays the e-book data.

In the embodiment 1, the client side sends the request for downloading the e-book data to the server and in the process that the server sends the e-book data to the SD Key after a successful request, if the e-book data being accessed is the first encrypted data, an order of Step 1 and Step 2 can be reversed; if the e-book data being accessed is the second encrypted data, the order of Step 1 and Step 2 cannot be reversed.

Embodiment 2

Embodiment 2 provides a method for binding the e-book hardware with the SD Key in Step 1 of Embodiment 1, but it is not a limit to the invention.

The below is a first method for binding the e-book hardware to the SD Key provided by Embodiment 2, comprising steps as follows.

Step 101, the e-book hardware generates a random number as a symmetrical key, specifically a symmetrical reading key herein, and the reading key inside each e-book is unique;

Or, the e-book hardware generates an unsymmetrical key, specifically an unsymmetrical reading key herein, and the reading key inside each e-book hardware is unique and the private part of the reading key cannot exported;

Or, the e-book hardware presets a symmetrical key, specifically a symmetrical reading key herein, and the reading key inside each e-book hardware is unique;

Or, the e-book hardware presets an unsymmetrical key, specifically an unsymmetrical reading key herein, and the reading key inside each e-book hardware is unique and private part of the reading key cannot be exported;

Or, when establishing a binding connection with the SD Key, the e-book hardware generates a random number as a symmetrical key, specifically a symmetrical reading key herein and the reading key inside each e-book is unique;

Or when establishing a binding connection with the SD Key, the e-book hardware generates an unsymmetrical key, specifically an unsymmetrical reading key herein, and the reading key inside each e-book is unique and private part of the reading key cannot be exported.

Step 102, the e-book hardware establishes a connection with the SD Key and sends the symmetrical reading key or the public part of the reading key to the SD Key, and the SD Key stores the public part of the reading key in the storage area.

The below is a second method for binding the e-book hardware to the SD Key, comprising steps as follows.

Step 201, the e-book hardware presets a plurality of symmetrical keys, specifically symmetrical reading keys herein, and each reading key inside the e-book is unique;

Or, the e-book hardware presets a plurality of unsymmetrical keys, specifically unsymmetrical reading keys herein, and each reading key inside the e-book is unique and private part of the reading key cannot be exported.

Step 202, the e-book hardware establishes a connection with the SD Key, selects a unbound reading key from the plurality of reading keys and sends the symmetrical reading key or the public part of the reading key to the SD Key, and the SD Key stores the symmetrical reading key or the public part of the reading key in the storage area, and the e-book hardware reads the hardware serial number of the current SD Key or the SD Key sends its hardware serial number to the e-book hardware, and then the e-book hardware stores the SD Key hardware serial number in the storage area.

It is noted that the hardware serial number of the SD Key is corresponding to the reading key.

It is also noted that the symmetrical key being generated inside the e-book hardware may be a random number being generated by a random number generator and the random number can be taken as a symmetrical key. The unsymmetrical key being generated inside the e-book hardware may be computed by an unsymmetrical key coprocessor with unsymmetrical algorithm.

The below is a third method for binding the e-book hardware to the SD Key provided by the embodiment, comprising steps as follows.

Step 301, when the e-book hardware establishes a connection with the SD Key, the SD Key generates a random number as the symmetrical key, specifically the symmetrical reading key herein, and the reading key inside each e-book is unique;

Or, when the e-book hardware establishes a connection with the SD Key, the SD Key generates an unsymmetrical key, specifically an unsymmetrical reading key herein, and the reading key inside each e-book is unique and private part of the reading key cannot be exported;

Or, the SD Key presets a symmetrical key, specifically a symmetrical reading key herein, and the reading key inside each e-book is unique;

Or, the SD Key presets an unsymmetrical key, specifically an unsymmetrical reading key herein, and the reading key inside each e-book is unique and private part of the reading key cannot be exported.

Step 302, when the e-book hardware is binding to the SD Key, the SD Key sends the symmetrical reading key or the public part of the reading key to the e-book hardware, and the e-book hardware reads the hardware serial number of the current SD Key or the SD Key sends its hardware serial number to the e-book hardware; and the e-book hardware stores the symmetrical reading key or the public part of the reading key and the SD Key hardware serial number in the storage area.

Of the above methods of the embodiment 2, both the symmetrical reading key and the unsymmetrical reading key are named after the reading key, and the public part of the reading key refers to the public part of the unsymmetrical reading key, and the private part of the reading key refers to the private part of the unsymmetrical reading key.

It is noted that the symmetrical key being generated inside the SD Key may be a random number being generated by the random number generator, which can be a symmetrical key; and the unsymmetrical key being generated inside the SD Key may be computed by an unsymmetrical key coprocessor with unsymmetrical algorithm.

Embodiment 3

Embodiment 3 provides a method for downloading the e-book data through the client side by the SD Key in Step 2 of Embodiment 1. The below sets forth a description of the invention in accompany with the drawings and the embodiment, but it is not a limit to the invention.

Figure 2:
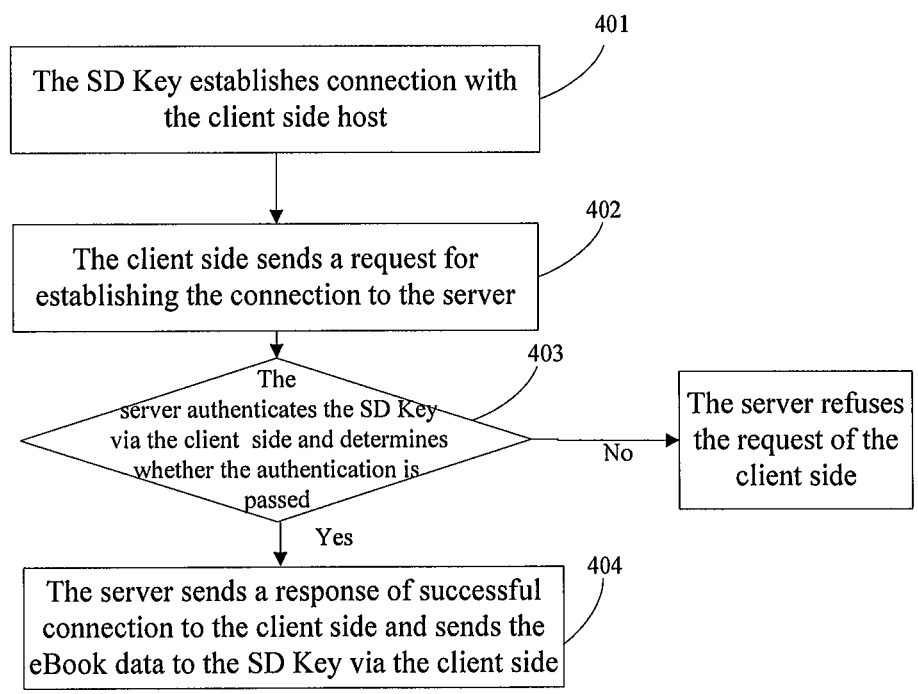
FIG. 2 illustrates a flow chart of a method with which a SD Key downloads e-book data through a client side provided by the present embodiment.

FIG. 2 is a chart of the method for downloading the e-book data through via the client side by the SD Key provided by Embodiment 3.

The below is a first method for downloading e-book data through the client side by the SD Key provided by Embodiment 3, comprising steps as follows.

Step 401, the SD Key establishes a connection with the client side host.

Step 402, the client side sends a request for establishing a connection to the server.

Preferably, the security area of the SD Key presets a symmetrical key, specifically a symmetrical downloading key herein, and a copy of the symmetrical downloading key is pre-stored in the database of the corresponding server while the symmetrical downloading key is stored in the security area of the SD Key and cannot be exported from the SD Key; or the security area of the SD Key presets a symmetrical key, specifically a symmetrical downloading key herein; and at the time of the first downloading, the client side sends the symmetrical downloading key in the SD Key to the server, and the server stores the symmetrical downloading key in the database; or at the time of the first downloading, the SD Key generates a random number as the symmetrical key, specifically the symmetrical downloading key herein, and the client side sends the symmetrical downloading key in the SD Key to the server, and the server stores the symmetrical downloading key in the database.

Step 403, the server authenticates the SD Key through the client side and determines whether the authentication is successful;

Specifically, upon receiving the request for establishing the connection being sent by the client side, the server authenticates the SD Key by Challenge-Response way and determines whether the authentication is successful.

The Challenge-Response way comprises that the server generates a challenge code randomly and sends the challenge code to the SD Key through the client side, of which the challenge code may be a string of numbers, characters, signs, and/or a combination of them, for example the challenge code may a 64-bit binary number.

Upon receiving the challenge code, the SD Key encrypts the challenge code with the symmetrical downloading key being preset in the SD Key so as to obtain a result, and the client side sends the result as the response data to the server.

The server side performs 3DES encryption on the challenge code with the copy of the SD Key symmetrical downloading key being stored in the server database or with the symmetrical downloading key being sent to the server by the client side at the time of the first downloading, so as so as to obtain the authentication data, and the server compares the authentication data with the response data being returned by the client side and determines whether they are identical;

if yes, the SD Key succeeds in establishing the connection with the server through the client side, and the client side accesses to the SD Key through the webpage ActiveX control technology or a program which runs on the client side and Step 404 is executed;

if no, the server refuses the request from the client side.

Step 404, the server sends a response of successful connection to the client side, and sends the e-book data to the SD Key through the client side, comprising the following steps.

Step 404-1, the server encrypts the e-book data being requested for downloading with symmetrical downloading key being backup in the server database or with the symmetrical downloading key being sent to the server by the client side at the time of the first downloading so as to form first encrypted data of the e-book, and sends the first encrypted data to the SD Key through the client side;

Step 404-2, the SD Key stores the first encrypted data being received in the storage area;

With the above methods, both the downloading key for downloading the e-book data by the client side and the reading key for accessing the e-book data by the e-book hardware are the same symmetrical keys as each other; for further protection of the e-book data, the above downloading key and the reading key may be different symmetrical keys, and Step 404 can be substituted with Step 404'.

Step 404', the server sends a response of successful connection to the client side, and sends the e-book data to the SD Key through the client side, including steps as follows.

Step 404'-1, the server encrypts the e-book data being requested for downloading with the symmetrical downloading key being copied by the server or with the symmetrical downloading key being sent to the server by the client side at the time of the first downloading so as to form first encrypted data of the e-book, and sends the first encrypted data to the SD Key through the client side;

Step 404'-2, the SD Key decrypts the received first encrypted data with the symmetrical downloading key which is stored and correspond to the encryption, so as to generate second plaintext data, encrypts the second plaintext data with the stored symmetrical reading key or private part of the reading key or public part of the reading key to obtain second encrypted data and stores the second encrypted data in the storage area.

Step 404 and Step 404' may also include the server sends the e-book data to the SD Key directly through the client side.

The below lists a second method for downloading the e-book data through the client side by the SD Key being provided by Embodiment 3, including the below steps.

Step 501, the SD Key establishes a connection with the client side host.

Step 502, the client side sends a request for establishing a connection to the server.

Preferably, the security area of the SD Key presets an unsymmetrical key, specifically the unsymmetrical downloading key herein, and the server database corresponding to the SD Key has pre-stored a copy of the downloading key, and the private part of the downloading key is stored in the security area of the SD Key, and cannot be exported from the SD Key. Or the security area of the SD Key presets an unsymmetrical key, specifically an unsymmetrical downloading key herein, and at the time of the first downloading, the client side sends the public part of the downloading key to the server and the server stores the public part of downloading key in the database while the private part of the downloading key is stored in the security area of the SD Key and cannot be exported. Or at the time of the first downloading, the SD Key generates an unsymmetrical key, specifically an unsymmetrical downloading key herein, and the client side sends the public part of the SD Key downloading key to the server, and the server stores the public part of the downloading key in the database while the private part of the downloading key is stored in the security area of the SD Key and cannot be exported from the SD Key.

Step 503, the server authenticates the SD Key through the client side and determines whether the authentication is passed, including the below steps.

Step 503-1, the server generates a random number as soon as it receives the request for establishing the connection being sent by the client side and sends the random number as a random key to the SD Key through the client side, of which the random number can be a 128-byte binary number.

Step 503-2, the SD Key receives the random key being sent by the server through the client side and signs the random key with the private part of the downloading key, and the client side sends the signature result as the authentication data to the server.

Step 503-3, the server decrypts the authentication data being returned by the client side by using the copy of the public of the downloading key being stored in the database or by using the public of the downloading key being sent to the server by the client side during the first downloading process, and determines whether the decrypted random key is identical to the random key being sent to the SD Key by the server, if yes, the SD Key succeeds in establishing the connection with the server via the client side, and the client side accesses to the SD Key by the webpage ActiveX control technology or the program running on the client side and goes to Step 504;

if yes, the SD Key succeeds in connection with the server through the client side and the client side accesses to the SD Key by the webpage ActiveX control technology or a program which runs on the client side and Step 504 is executed;

if no, the server stops the operation.

Step 504, the server sends a response of successful connection to the client side and sends the e-book data to the SD Key through the client side.

Step 504-1, the server encrypts the e-book data being requested for downloading, with the public part of the downloading key being backup in the server database or with the public part, of the downloading key which is sent to the server by the client side at the time of the first downloading, so as to form and send the first encrypted data of the e-book to the SD Key through the client side.

Step 504-2, the SD Key stores the first encrypted data being received in the storage area.

With the above mentioned method, the downloading key for downloading the e-book data by the client side and the reading key for accessing to the e-book data by the e-book hardware are the same unsymmetrical key as each other, which can also be two different unsymmetrical keys for improving protection of the e-book data and correspondingly, Step 504 can be substituted with Step 504'.

Step 504', the server sends a response of successful connection to the client side and sends the e-book data to the SD Key through the client side, including below steps.

Step 504'-1, the server encrypts the e-book data being requested for downloading with the public part of the downloading key being backup by the server or with the public part of the downloading key being sent to the server by the client side so as to form first encrypted data of the e-book and sends the first encrypted data to the SD Key through the client side.

Step 504'-2, the SD Key decrypts the first encrypted data being received with the private part of the downloading key which is stored and corresponds to the encryption process, so as to form second plaintext data, and encrypts the second plaintext data with the symmetrical reading key being stored or with private part of the reading key or with the public part of the reading key to obtain second encrypted data and stores the second encrypted data in the storage area.

Step 504 and Step 504' can also include that the server sends the e-book data to the SD Key directly through the client side.

The below is a third method for downloading the e-book data by the SD Key through the client side provided by Embodiment 3, including steps as follows.

Step 601, the SD Key establishes a connection with the client side.

Step 602, the client side sends a request for establishing a connection with the server.

Preferably, the security area of the SD Key presets an unsymmetrical key, specifically an unsymmetrical downloading key herein, and a copy of the public part of the downloading key is pre-stored in the server database corresponding to the SD Key while the private part of the downloading key is stored in the security area of the SD Key and cannot be exported; or the security area of the SD Key presets an unsymmetrical key, specifically an unsymmetrical downloading key herein, and at the time of the first downloading, the client side sends the public part of the downloading key of the SD Key to the server and the server stores the public part of the downloading key in the database while the private part of the downloading key is stored in the security area of the SD Key and cannot be exported; or at the time of the first downloading, the SD Key generates an unsymmetrical key, specifically an unsymmetrical downloading key herein and the client side sends the SD Key to the server and the server stores the public part of the downloading key in the database while the private part of the downloading key is stored in the security area of the SD Key and cannot be exported from the SD Key.

Step 603, the server authenticates the SD Key through the client side and determines whether the authentication is successful, including steps as follows.

Step 603-1, the server generates a random number as soon as it receives the request for establishing the connection being sent by the client side, and sends the random number as the random key to the SD Key through the client side, of which the random number can be a 128-byte binary number.

Step 603-2, the SD Key receives the random key being sent by the server through the client side and signs the random key with the private part of the downloading key, and the client side takes the signature result as the authentication data and returns the same to the server.

Step 603-3, the server decrypts the authentication data being returned by the SD Key by using the copy of the public part of the downloading key being stored in the database, or by using the public part of the downloading key being returned to the server by the client side at the time of the first downloading, and determines whether the decrypted random key is identical to the random key being sent to the SD Key;

if yes, the client side succeeds in connection with the server, accesses to the SD Key by the webpage ActiveX control technology or the program running on the client side and goes to Step 604;

if no, the server refuses the request of the client side.

Step 604, the server sends the response of succeeding in connection to the client side and sends the e-book data to the SD Key through the client side, including steps as follows.

Step 604-1, the server generates a random number as the symmetrical key, specifically the session key herein.

Step 604-2, the server encrypts the e-book data being requested for downloading with the session key being generated so as to form the first encrypted data of the e-book.

Preferably, the random number may be a random number, such as an e-book record number and a downloading time; or the e-book record number and a number of downloading times; or a hash value of the random number such as a hash value of the e-book record number and the downloading time or a hash value of the e-book record number and the number of downloading times, and each downloading process uses different passwords which ensure one password for one time downloading.

Step 604-3, the server encrypts the session key with the public part of the downloading key being back up in the server database or with the public part of the downloading key being sent to the server by the SD Key at the time of the first downloading to form the encrypted session key.

Step 604-4, the server sends the first encrypted data and the encrypted session key to the SD Key.

Step 604-5, the SD Key stores the first encrypted data and the encrypted session key in the storage area.

It is noted that order of Step 604-2 and Step 604-3 can be reversed.

With the above mentioned method, the downloading key for downloading the e-book data by the client side and the reading key for accessing the e-book data by the e-book hardware are same unsymmetrical keys, which can be two different unsymmetrical keys for improving protection of the e-book data and correspondingly, Step 604 can be substituted with Step 604'.

Step 604', the server sends a response of successful connection to the client side and sends the e-book data to the SD Key through the client side, including the below steps.

Step 604'-1, the server generates a random number as the symmetrical key, specifically the session key herein.

Step 604'-2, the server encrypts the e-book data being requested for downloading with session key being generated to form first encrypted data of the e-book.

Specifically, the random number may be a random number, such as an e-book record number and a downloading time; or the e-book record number and a number of downloading times; or a hash value of the random number such as a hash value of the e-book record number and the downloading time or a hash value of the e-book record number and the number of downloading times, and each downloading process uses different password which ensures one password for one time downloading.

Step 604'-3, the server encrypts the session key with the public part of the downloading key being back up in the server database or with the public part of the downloading key being sent to the server by the client side at the time of the first downloading process to form the encrypted session key.

Step 604'-4, the server sends the first encrypted data and the encrypted session key to the SD Key through the client side.

Step 604'-5, the SD Key decrypts the encrypted session key by using the private part of the downloading key being stored so as to obtain the session key and decrypts the first encrypted data being received with the session key so as to obtain the second plaintext data.

Step 604'-6, the SD Key encrypts the second plaintext data with the corresponding symmetrical reading key being stored or the private part of the reading key or the public part of the reading key so as to obtain second encrypted data and stores the second encrypted data in the storage area.

It is noted that the order of Step 604'-2 and Step 604'-3 can be reversed.

Step 604 and Step 604' may further include that the server sends the e-book data to the SD Key through the client side.

With all listed methods of the embodiment 3, both the symmetrical downloading key and the unsymmetrical downloading key are downloading keys, and the public part of the downloading key refers to the public part of the unsymmetrical downloading key while the private part of the downloading key refers to the private part of the unsymmetrical downloading key.

Embodiment 4

Embodiment 4 details the method for accessing to the e-book data in the SD Key by the e-book hardware in Step 3 of Embodiment 1, but it is not a limit to the invention.

The below is a first method for accessing to the e-book data in the SD Key by the e-book hardware provided by Embodiment 4, of which the downloading key is different from the reading key, including steps as follows.

Step 701, the e-book hardware establishes a connection with the SD Key.

Step 702, the e-book hardware sends a request for accessing the e-book data to the SD Key, and the SD Key responses to the request of the e-book hardware, and sends the second encrypted data being requested to the e-book hardware.

Step 703, the e-book hardware decrypts the second encrypted data with the symmetrical reading key being stored or with the public part of the reading key being stored, if the symmetrical reading key or the public part of the reading key matches with the symmetrical reading key or the private part of the reading key being used by the encryption process, the e-book hardware decrypts the second encrypted data so as to obtain the plaintext data, reads and outputs the plaintext data to a display; or if the symmetrical reading key or the public part of the reading key does not match with the symmetrical reading key or the private part of the reading key being used by the encryption process, the e-book does not display the plaintext data normally;

or the e-book decrypts the encrypted data with the private part of the reading key being stored, if the private part of the reading key matches the public part of the reading key used by encrypting the second plaintext data, it decrypts the second encrypted data so as to obtain the plaintext data, reads and outputs the plaintext being read to a display; or if the private part of the reading key does not match the public part of the reading key used by encrypting the second plaintext data, the e-book hardware does not display the plaintext as usual.

The below is a second method for accessing the e-book data in the SD Key by the e-book hardware provided by Embodiment 4, of which the downloading key is different from the reading key, including steps as follows.

Step 801, the e-book hardware establishes a connection with the SD Key.

Step 802, the e-book hardware sends a request for accessing the e-book data to the SD Key and after the SD Key responses to the request of the e-book hardware, the e-book hardware reads the hardware serial number of the SD Key or the SD Key sends its hardware serial number to the e-book hardware, and then the e-book hardware compares the hardware serial number with the hardware serial number being stored at the time of the binding, if a match is not found, the e-book hardware fails to access the SD Key;

if a match is found, Step 803 is executed.

Step 803, the e-book hardware sends response of a match being found to the SD Key, and the SD Key sends the second encrypted data being requested to the e-book hardware, and the e-book hardware obtains the symmetrical reading key corresponding to the hardware serial number or the public part of the reading key, decrypts the second encrypted data with the reading key or the public part of the reading key so as to obtain the plaintext data, the e-book hardware accesses and outputs the plaintext data to a display.

Or Step 803 can be substituted with Step 803'.

Step 803', the e-book hardware sends a response of match being found to the SD Key, and the SD Key decrypts the second encrypted data being requested by using the symmetrical reading key corresponding to the hardware serial number or by using the public part of the reading key or by using the private part of the reading key corresponding to the encryption, so as to obtain the e-book plaintext data and sends the plaintext data to the e-book hardware, and the e-book hardware accesses and outputs the plaintext data to a display.

The below is a third method for accessing the e-book data in the SD Key by the e-book hardware provided by the embodiment, of which the downloading key is different from the reading key, including steps as follows.

Step 901, the e-book hardware establishes a connection with the SD Key.

Step 902, the e-book hardware sends a request for accessing the e-book data to the SD Key, and after the SD Key responses to the request of the e-book hardware, the e-book hardware reads the hardware serial number of the SD Key or the SD Key sends its hardware serial number to the e-book hardware, and the e-book hardware compares the hardware serial number with the hardware serial number being stored at the time of the binding, if a match is not found, the e-book hardware fails to access the SD key;

if a match is found, Step 903 is executed.

Step 903, the SD Key sends a response of the match being found to the e-book hardware and decrypts the first encrypted data by using the symmetrical reading key corresponding to the hardware serial number or the public part of the reading key or the private part of the reading key corresponding to the encryption so as to obtain the plaintext data, and the e-book hardware reads and outputs the plaintext data to a display.

Or the SD Key sends a response of the match being found to the e-book hardware and decrypts the encrypted session key by using the private part of the downloading key corresponding to the encryption process, to obtain the session key and decrypts the first encrypted data by using the session key so as to obtain the e-book plaintext data, and the e-book hardware reads and outputs the plaintext data to a display.

The below is a fourth method for accessing the e-book data in the SD Key by the e-book hardware provided by the embodiment, of which the downloading key is identical to the reading key, including steps as follows.

The e-book hardware sends a request of accessing the e-book data to the SD Key after establishing a connection with the SD Key, and the SD Key responses to the request and sends the first encrypted data to the e-book hardware; or does not response to the request and sends the first encrypted data to the e-book hardware directly.

The e-book hardware uses the reading key being stored in the e-book hardware to decrypt the first encrypted data, and displays the e-book data being accessed to on its display in case of a successful decryption or displays messy codes on the display in case of a failure decryption.

Embodiment 5

Figure 3:
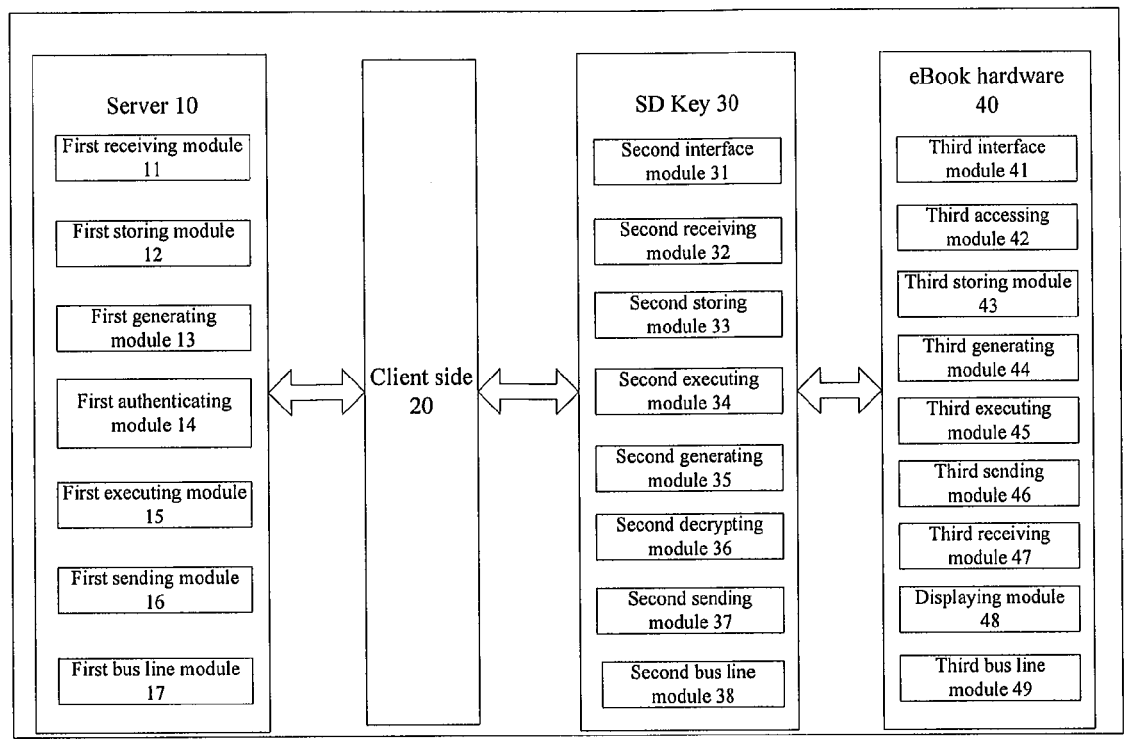
FIG. 3 illustrates a systematic chart of accessing e-book data provided by the present embodiment.

FIG. 3 is a systematic chart of downloading and accessing the first e-book data provided by Embodiment 5, including a server 10, a client side 20, an SD Key 30, and an e-book hardware 40.

Specifically, the server 10 includes a first receiving module 11, a first storing module 12, a first generating module 13, a first authenticating module, a first executing module 15, a first sending module 16, and a first bus line module 17.

The first receiving module 11 is applied for receiving a symmetrical downloading key being sent by the second sending module 37 or for receiving the public part of the downloading key.

The first storing module 12 is applied for storing all the e-book data and for storing a database which includes all the downloading keys or all copies of the public parts of the downloading keys.

The first generating module 13 is applied for generating a random number.

The first authenticating module 14 is applied for determining whether the downloading request being sent to the server 10 by the client side 20 is passed.

The first executing module 15 is applied for encrypting the data being sent to the SD Key 30.

The first sending module 16 is applied for sending the encrypted data to the SD Key 30.

The first bus line module 17 is applied for connecting all modules at the server side 10, and communications among all modules are completed by the first bus line module 17.

Further, the first generating module 13 is applied for generating a random number, including generating a challenge code or a random key at the time that the server 10 authenticates the identity of the SD Key 30 through the client side 20.

The first generating module 13 is applied for generating the random number and further for generating a session key.

For example, the session key may be a random number, such as "an e-book record number and a downloading time", or "the e-book record number and a number of the downloading times"; while, the session key may also be a hash value or a message value of the random number, such as a hash value or a message value of "the e-book record number and the downloading time", or a hash value or a message value of "the e-book record number and the number of the downloading times".

The first authenticating module 14 is applied for authenticating identity of the SD Key 30 being inserted into the client side 20 which communicates with the server 10.

Specifically, when sending the downloading request to the server 10, the client side 20 searches for a copy of the SD Key 30 downloading key or a copy of the public part of the downloading key in the downloading request;

if there is not the copy of the downloading key in the database, the server refuses the request of the client side 20;

if there is the copy of the downloading key in the database, the first authenticating module 14 notifies the first generating module 113 of generating the challenge code.

The first authenticating module 14 is applied for computing the challenge code by using the SD Key 30 symmetrical downloading key in the first storing module 12 or by using the copy of the public part of the downloading key so as to obtain the authentication data after the first generating module 13 generates the challenge code, and for comparing the authentication data with the result of the response data being returned by the SD Key 30 and determining whether a match is found, if yes, the server responses to the request of the client side 20 and sends the encrypted e-book data to the SD Key 30 through the client side 20;

if no, the server refuses the request of the client side 20.

The first authenticating module 14 is further applied for decrypting the authentication data being returned by the client side 20 to obtain the random key, compares the random key with the random key being generated by the first generating module 13 and determines whether a match is found, if yes, the server responses to the request of the client side 20 and sends the encrypted e-book data to the SD Key 30 through the client side 20;

if no, the server refuses the request of the client side 20.

The first executing module 15 is applied for encrypting the SD Key 30 data, including that the first executing module 15 encrypts the e-book data being requested with the symmetrical downloading key in the database of the first storing module 12 or the copy of the public part of the downloading key so as to generate the first encryption data.

The first executing module 15 is applied for encrypting the data being sent to the SD Key 30, including that it uses the session key being generated by the first generating module 13 to encrypt the e-book data being requested to form the first encrypted data, and uses the symmetrical downloading key in the database of the first storing module 12 or the copy of the public part of the downloading key to encrypt the session key, so as to form the encrypted session key.

The first sending module 16 is applied for sending the encrypted data to the SD Key 30 through the client side 20, especially including that the challenge code or the random number generated by the random number generating module 13 is transmitted by the SD Key 30.

The first sending module 16 is applied for sending the first encrypted data to the SD Key 30 through the client side 20 or for sending the first encrypted data and the encrypted session key to the SD Key 30 through the client side 20.

Correspondingly, the client side 20 is applied for connecting with the SD Key 30, and for communicating with the server 10, so as to ensure the data exchange between the SD Key 30 and the server 10.

Correspondingly, the SD Key 30 includes a second interface module 31, a second receiving module 32, a second storing module 33, a second executing module 34, a second generating module 35, a second decrypting module 36, a second sending module 37, and a second bus line module 38.

The second interface module 31 is applied for connecting the SD Key 30 to the client side 20 and the e-book hardware 40.

Preferably, the SD Key 30 is an information security device with a standard SD card interface, having functions of encryption lock and storage.

The second receiving module 32 is applied for receiving and storing the first encrypted data being sent by the first sending module 16 in the second storing module 33, and for receiving the symmetrical reading key or the public part of the reading key being sent by the third sending module 46.

The second storing module 33 is applied for storing the e-book data or the key being sent by the e-book and for storing the key being preset or the key being generated by the second generating module 35.

The second executing module 34 is applied for encrypting or decrypting the data or the key. The second generating module 35 is applied for generating the symmetrical reading key or the unsymmetrical reading key.

The second decrypting module 36 is applied for decrypting the encrypted data in the second storing module 33 into the plaintext data.

The second sending module 37 is applied for sending the plaintext data in the second decrypting module 36 or the encrypted data in the second storing module 33 to the e-book hardware, for sending the symmetrical downloading key in the second generating module 35 or the public part of the downloading key to the first receiving module 11 through the client side 20, and for sending the SD Key 30 hardware serial number to the e-book hardware 40.

The second bus line module 38 is applied for connecting all hardware modules in the SD Key 30 and communication between any two hardware modules is performed via the second bus line module 38.

Further, the second storing module 33 is applied for storing the downloading key being preset and for storing the symmetrical downloading key or the unsymmetrical downloading key being generated by the second generating module 35.

The second storing module 33 is applied for storing the reading key being preset and for storing the symmetrical reading key or the unsymmetrical reading key being generated by the second generating module 35.

The second storing module 33 is applied for storing the encrypted data being sent by the server, or for storing the encrypted data being sent by the server and the encrypted session key, for storing the symmetrical reading key being sent by the e-book 40 or the public part of the reading key as well as the second encrypted data being generated by the second executing module 35.

The second executing module 34 is applied for encrypting or decrypting the data, including that it encrypts the challenge code being sent by the server 10, and takes the encryption result as the response data, and is also applied for encrypting the random number being sent by the server 10, and taking the encryption result as the authentication data.

The second executing module 34 is applied for decrypting the encrypted data being sent by the server 10 with the symmetrical downloading key in the second storing module 33 or the private part of the downloading key so as to generate the second plaintext data, for encrypting the second plaintext data with the symmetrical reading key in the second storing module 33 or with the public of the reading key or with the private part of the reading key so as to form the second encrypted data, and for storing the second encrypted data in the second storing module 33.

The second executing module 34 is applied for decrypting the encrypted session key being generated by the first executing module 15 with the symmetrical downloading key in the second storing module 33 or with the private part of the downloading key so as to obtain the session key, for decrypting the first encrypted data with the session key in the second storing module 33 to obtain the second plaintext data, for encrypting the second plaintext data with the symmetrical reading key in the second storing module 33 or with the public part of the reading key or with the private part of the reading key so as to generate the second encrypted data, and for storing the second encrypted data in the second storing module 33.

Correspondingly, the e-book hardware 40 includes a third interface module 41, a third accessing module 42, a third storing module 43, a third generating module 44, a third executing module 45, a third sending module 46, a third receiving module 47, a displaying module 48, and a third bus line module 49.

The third interface module 41 is applied for connecting the SD Key 30 with the device hardware of the e-book hardware 40.

The third accessing module 42 is applied for sending a request for accessing to the e-book data to the SD Key 30, for reading the hardware serial number of the SD Key 30 at the time of the binding, and for reading the hardware serial number of the SD Key 30 at the time that the e-book hardware 40 accesses to the e-book data in the SD Key 30.

The third storing module 43 is for storing the symmetrical reading key being sent by the SD Key 30 or the public part of the reading key, for storing the symmetrical reading key or the unsymmetrical reading key being preset or generated randomly by the e-book hardware and for storing the hardware serial number of the SD Key 30 being sent by the second sending module 37.

The third generating module 44 is applied for generating the symmetrical downloading key or the unsymmetrical downloading key.

The third executing module 45 is applied for decrypting the first encrypted data or the second encrypted data being sent by the SD Key 30 with the symmetrical reading key in the third storing module 43 or the public part of the reading key to obtain the plaintext data and for decrypting the first encrypted data or the second encrypted data being sent by the SD Key 30 with the private part of the reading key being stored in the third storing module 43 so as to obtain the plaintext data.

The third executing module 45 is applied for comparing the SD Key 30 hardware serial number in the third storing module 43 with the SD Key 30 hardware serial number being read at the time that the e-book hardware 40 accesses to the e-book data in the SD Key 30 and determining whether a match is found.

The third sending module 46 is applied for sending the symmetrical reading key being generated by the third generating module 44 or the public part of the reading key to the second receiving module 32 in the SD Key 30.

The third receiving module 47 is applied for receiving the plaintext data or the encrypted data being sent by the second sending module 37 and for receiving the symmetrical reading key being sent by the second sending module 37 or the public part of the reading key.

The displaying module 48, connecting with the third accessing module 42, is applied for displaying the plaintext data being decrypted by the third executing module 45 or the plaintext data in the third receiving module 47 on the display.

The third bus line module 49 is applied for connecting all hardware modules in the e-book hardware 40 and communication between any two hardware modules are performed through the third bus line module 49.

The above are just preferred embodiments of the invention, however, the scope of protection according to the invention is not be wholly covered. Any change or substitution being easily thought of by those skilled in the art within the technology scope being disclosed by the invention should be fallen into the scope of protection of the invention. Therefore, the scope of protection of the invention should be based on the appended claims.

What is claimed is:

1. A method for accessing to e-book data, wherein said method comprises that

Step A. an e-book hardware establishes a connection with an electronic device, and consults with the electronic device for a reading key, in which the electronic device is a device with an interface compatible with a SD card, functions of encryption and decryption, and function of storage in which that the electronic hardware consults with the electronic device for a reading key comprises that the e-book hardware generates the reading key and sends the reading key to the electronic device, or the electronic device generates the reading key and sends the reading key and/or a hardware serial number of the electronic device to the e-book hardware, in which the reading key is a symmetrical key or an unsymmetrical key, and the key being sent is a public part of the unsymmetrical key in case that the reading key is an unsymmetrical key;

Step B. the electronic device downloads the e-book data through a client side, which specifically comprises that firstly, the electronic device establishes a connection with the client side;

the client side sends a request for establishing a connection to the server; and the server authenticates identity of the electronic device through the client side, and refuses the access in case of failed authentication, otherwise encrypts the e-book data with a downloading key and sends the encrypted e-book data to the electronic device through the client side;

in which the method further including: consulting for the downloading key comprises that the electronic device presets an unsymmetrical downloading key and personally stores the private part of the downloading key, and the server pre-stores a public part copy of the downloading key which matches with the private part of the downloading key, or the electronic device sends the public part of the downloading key to the server for storing when downloading the e-book through the client side for the first time; and Step C. the e-book hardware establishes the connection with the electronic device, processes the encrypted e-book data with the downloading key and/or with the reading key, and the e-book hardware displays the e-book data;

in which Step A can be executed after Step B.

2. The method for accessing to e-book data of claim 1, wherein that the e-book hardware generates a reading key comprises two ways: pre-setting the reading key or pre-generating the reading key; that the electronic device generates a reading key comprises pre-setting the reading key or pre-generating the reading key; the reading key is a symmetric key; and that the e-book hardware generates a reading key comprises that the e-book hardware pre-generates a random number as the symmetric key.

3. The method for accessing to e-book data of claim 1, wherein that the e-book hardware or the electronic device generates a reading key comprises that the e-book hardware or the electronic device generates a random number as the symmetric key or the unsymmetrical key when the e-book hardware is connected to the electronic device.

4. The method for accessing to e-book data of claim 1, wherein the consulting on a downloading key comprises that the electronic device presets or randomly pre-generates a symmetric downloading key, and the electronic device downloads the e-book directly through the client side when first downloading the e-book, and sends the downloaded key to the server for storing through the client side; or the electronic device presets a symmetric downloading key, and the server pre-stores a corresponding copy of the symmetric key;

that the server authenticates the identity of the electronic device through the client side is processed by a way of Impulse Response which comprises that the server generates a challenge code, and sends the challenge code to the electronic device through the client side;

upon receiving the challenge code, the electronic device encrypts the challenge code with the downloading key or with the copy of the downloading key, takes the encrypted result as response data, and sends the response data back to the server through the client side;

the server encrypts the challenge code with the downloading key so as to obtain the authentication data, compares the authentication data with the response data returned by the electronic device, and determines whether they are identical; and that the server sends the e-book data being encrypted with the downloading key to the electronic device through the client side comprises that the server encrypts the e-book data being requested for downloading with the downloading key being stored or the copy of the downloading key so as to form a first encrypted data of the e-book, and sends the first encrypted data to the electronic device through the client side, and the electronic device stores the first encrypted data; and the electronic device consults with the e-book hardware for a reading key before downloading the e-book data through the client side, decrypts the first encrypted data with the corresponding downloading key and generates a second plaintext data;

encrypts the second plaintext data with the symmetric reading key, the private part of the reading key, or the public part of the reading key, so as to obtain a second encrypted data and stores the second encrypted data.

5. The method for accessing to e-book data of claim 4, wherein said Step C comprises that the e-book hardware sends a request for accessing to e-book data to the electronic device, and the electronic device responses to the request and sends the first encrypted data to the e-book hardware; or directly sends the first encrypted data to the e-book hardware; and the e-book hardware decrypts the first encrypted data with the reading key being stored.

6. The method for accessing to e-book data of claim 1, wherein that the server authenticates the identity of the electronic device through the client side comprises that the server generates a random number upon receiving the request for establishing a connection being sent by the electronic device, takes the random number as a random key and sends the random key to the electronic device; the electronic device signs the random key being received with the private part of the downloading key, takes the signature result as the authentication data and returns the authentication data to the server through the client side; the server verifies whether the authentication data is a correct signature with the public part of the downloading key being stored or a copy of the public part of the downloading key and the random number being generated; and that the server sends the e-book data being encrypted with the downloading key to the electronic device through the client side comprises that the server encrypts the e-book data being requested for downloading with the public part of the downloading key being stored, or a copy of the public part of the downloading key, forms the first encrypted data of the e-book and sends the first encrypted data to the electronic device through the client side, and the electronic device stores the first encrypted data; and -6-the electronic device consults with the e-book for a reading key before downloading the e-book data through the client side, decrypts the first encrypted data with the private part of the downloading key so as to obtain the second plaintext data, encrypts the second plaintext data with the symmetrical reading key, the private part of the reading private key, or the public part of the reading key, so as to obtain the second encrypted data and stores the second encrypted data.

7. The method for accessing to e-book data of claim 6, wherein the e-book hardware presets a plurality of reading keys, and said Step A comprises that the e-book hardware establishes the connection with the electronic device, selects an unused reading key from the plurality reading keys, sends the reading key being selected to the electronic device, reads and stores the hardware serial number of the electronic device, in which the reading key being sent to the electronic device is one-by-one correspondence to the hardware serial number of the electronic device; and correspondingly, said Step C comprises that the e-book hardware sends a request for accessing to e-book data and a hardware serial number being stored by itself to the electronic device, and the electronic device determines whether the hardware serial number of itself is identical to the hardware serial number being sent by the e-book hardware, if yes, the electronic device responses to the request and decrypts the first encrypted data with the private part of the reading key identical to the hardware serial number; or directly decrypts the first encrypted data with the private part of the reading key identical to the hardware serial number without a response;

if no, the access is failed.

8. The method for accessing to the e-book data of claim 1, wherein that the server sends the e-book data being encrypted with the downloading key through the client side to the electronic device comprises that the server generates a random number as a symmetrical session key, and encrypts the e-book data being requested for downloading with the session key, so as to form the first encrypted data of the e-book; the server encrypts the session key with the public part of the downloading key or the copy of the public part of the downloading key, so as to form an encrypted session key; the server sends the first encrypted data and the encrypted session key to the electronic device through the client side; and the electronic device stores the first encrypted data being received and the session key being encrypted.

9. The method for accessing to e-book data of claim 8, wherein the session key comprises an e-book record number and a downloading time; an e-book record number and a number of downloading times; a hash value of the e-book record number and the downloading time; or a hash value of the e-book record number and the number of downloading times.

10. The method for accessing to e-book data of claim 8, wherein the electronic device consults with the e-book hardware for a reading key before downloading the e-book data through the client side, decrypts the encrypted session key with the private part of the corresponding downloading key so as to obtain the session key, and decrypts the first encrypted data being received with the obtained session key so as to obtain the second plaintext data; and the electronic device encrypts the second plaintext data with the symmetrical reading key, the private part of the reading key, or the public part of the reading key so as to obtain second encrypted data, and stores the second encrypted data.

11. The method for accessing to e-book data of claim 8, wherein the e-book hardware presets a plurality of reading keys, and said Step A comprises that the e-book hardware establishes a connection with the electronic device, selects an unused reading key from the plurality reading keys, sends the reading key being selected to the electronic device, then reads and stores the hardware serial number of the electronic device, in which the reading key being sent to the electronic device is one-by-one correspondence to the hardware serial number of the electronic device; and correspondingly, said Step C comprises that the e-book hardware sends a request for accessing to e-book data and a hardware serial number being stored by itself to the electronic device, determines whether the hardware serial number of itself is identical to the hardware serial number being sent by the e-book hardware, if yes, the electronic device responses to the request and decrypts the encrypted session key with the private part of the reading key which is identical to the hardware serial number, so as to obtain the session key, and decrypts the first encrypted data with the session key so as to obtain the e-book data;

if no, the access is failed.

12. The method for accessing to e-book data of claim 1, wherein said Step C comprises that the e-book hardware sends a request for accessing e-book data to the electronic device, and the electronic device responses to the request and sends the second encrypted data to the e-book hardware; or sends the second encrypted data to the e-book hardware directly without a response to the request; and the e-book hardware decrypts the second encrypted data with the reading key being consulted for at the time of establishing the connection with the electronic device, and displays the decryption result.

13. The method for accessing to e-book data of claim 1, wherein the e-book hardware presets a plurality of reading keys, and said Step A comprises that the e-book hardware establishes a connection with the electronic device, selects an unused reading key from the plurality of reading keys and sends the same to the electronic device, then reads and stores the hardware serial number of the electronic device, in which the reading key being sent to the electronic device is one-by-one correspondence to the hardware serial number of the electronic device; and correspondingly, said Step C comprises that the e-book hardware sends a request for accessing to the e-book data to the electronic device, and the electronic device responses to the request, and the e-book hardware reads directly the hardware serial number of the electronic device upon receiving the response, compares the read hardware serial number of the electronic device with the hardware serial number being stored at the time of consulting for the reading key, and determines whether a match is found, if no, the access is failed;

if yes, the e-book hardware sends the determination result to the electronic device, and the electronic device sends the second encrypted data to the e-book hardware upon receiving the determination result, and the e-book hardware obtains the reading key corresponding to the hardware serial number being stored at the time of binding, decrypts the second encrypted data being received with the reading key, so as to obtain the second plaintext data, and outputs the second plaintext data to a display for displaying.

14. The method for accessing to e-book data of claim 1, wherein the e-book hardware presets a plurality of reading keys, and said Step A comprises that the e-book hardware establishes a connection with the electronic device, selects an unused reading key from the plurality reading keys, sends the reading key being selected to the electronic device, then reads and stores the hardware serial number of the electronic device, in which the reading key being sent to the electronic device is one-by-one correspondence to the hardware serial number of the electronic device; and correspondingly, said Step C comprises that the e-book hardware sends a request for accessing the e-book data to the electronic device and the hardware serial number being stored at the time of consulting for the reading key, and the electronic device determines whether the hardware serial number being sent by the e-book hardware is identical to the hardware serial number of itself, if yes, the electronic device responses to the request, decrypts the second encrypted data being stored with the reading key so as to obtain second plaintext data and sends the second plaintext data to the e-book hardware, and the e-book hardware receives and outputs the second plaintext data to a display for displaying; if no, the access is refused.

15. A system of accessing to e-book data, comprising a server, a client side, and an e-book hardware, wherein said system further comprises an e-book device, the server comprises a first receiving module for receiving a downloading key being sent by a second sending module;

a first storing module for storing the e-book data and the downloading key;

a first authenticating module for authenticating the identity of the electronic device which is inserted into the client side which communicates with it;

a first executing module for encrypting the e-book data being stored with the downloading key in the first storing module so as to form first encrypted data;

a first sending module for sending the first encrypted data to the electronic device;

a first bus line module for connecting all hardware modules in the server;

the client side is provided for connecting to the electronic device and communicating with the server; and the electronic device is with an interface compatible with a SD card, and means for having functions of encryption, decryption and storage, and the electronic device comprises a second interface module for connecting the electronic device respectively to the client side and the e-book hardware;

a second receiving module for receiving and storing the first encrypted data being sent by the first sending module and for receiving the reading key being sent by the third sending module;

a second generating module for generating the downloading key and/or the reading key which is/are symmetrical key or unsymmetrical key;

a second executing module for decrypting the first encrypted data being received by the second receiving module and encrypting the decrypted data with the reading key in the second generating module so as to form second encrypted data;

a second storing module for storing the second encrypted data being generated by the second executing module or the first encrypted data being received by the second receiving module, and for storing the reading key being sent by the e-book hardware;

a second decrypting module for decrypting the encrypted data in the second storing module to obtain plaintext data of the e-book;

a second sending module for sending the plaintext data in the second decrypting module or the encrypted data in the second storing module to the e-book hardware, for sending the reading key in the second generating module to the e-book hardware and for sending the downloading key in the second generating module to the first receiving module through the client side; and a second bus line module for connecting all the hardware modules in the electronic device; and the e-book hardware comprises a third interface module for connecting the electronic device to the e-book hardware and for connecting the third interface module to the second interface module;

a third accessing module for sending a request for accessing the e-book data to the electronic device and being connected to the second decrypting module;

a third receiving module for receiving the plaintext data or the encrypted data being sent by the second sending module and for receiving the reading key being sent by the second sending module;

a third generating module for generating a symmetrical reading key or an unsymmetrical reading key;

a third storing module for storing the reading key being received by the third receiving module or for storing the reading key being generated by the third generating module;

a third sending module for sending the reading key being generated by the third generating module to the second receiving module;

a third executing module for decrypting the encrypted data in the third receiving module with the reading key in the third storing module so as to obtain the plaintext data; and a third bus line module for connecting all modules in the e-book hardware in which that the e-book hardware consults with the e-book device for a reading key comprises that the e-book hardware generates the reading key and sends the reading key to the e-book device, or the e-book device generates the reading key and sends the reading key and/or a hardware serial number of the e-book device to the e-book hardware, in which the reading key is a symmetrical key or an unsymmetrical key, and the key being sent is a public part of the unsymmetrical key in case that the reading key is an unsymmetrical key; consulting for the downloading key comprises that the e-book device presets an unsymmetrical downloading key and personally stores the private part of the downloading key, and the server pre-stores a public part copy of the downloading key which matches with the private part of the downloading key, or the e-book device sends the public part of the downloading key to the server for storing when downloading the e-book through the client side for the first time.

16. The system of accessing to e-book data of claim 15, wherein the server comprises a first generating module for generating and sending a challenge code to the electronic device;

the second executing module is used for encrypting the challenge code with the downloading key being generated by the second generating module and returning the encrypted result as response data to the first authenticating module; and the first authenticating module encrypts the challenge code with the downloading key in the first storing module so as to obtain authentication data and compares the authentication data with the response data being returned by the second executing module and determines whether a match is found.

17. The system of accessing to e-book data of claim 15, wherein the server comprises a first generating module for generating a random number, taking the random number as a session key and sending the session key to the second executing module;

the second executing module is for signing the random key being received with the private part of the downloading key being generated by the second generating module, taking the signature result as the authentication data, and returning the authentication data to the first authenticating module of the server;

the first authenticating module of the server authenticates whether the authentication data is a correct signature with the public part of the downloading key and the random number in the first storing module; and the session key comprises an e-book record number and a downloading time; the e-book record number and a number of downloading times; a hash value of the e-book record number and the downloading time; or a hash value of the e-book record number and the number of downloading times.

18. The system of accessing to e-book data of claim 15, wherein the server comprises a first generating module for generating a random number as the symmetrical session key;

the first executing module is used for encrypting the e-book data with the session key so as to form first encrypted data and for encrypting the session key with the public part of the downloading key so as to form encrypted session key;

the first sending module is used for sending the first encrypted data and the encrypted session key to the second receiving module; and the second executing module is used for decrypting the first encrypted data being received by the second receiving module and for encrypting the decrypted data with the reading key in the second generating module so as to form the second encrypted data, which specifically comprises that the second executing module uses the downloading key being generated by the second generating module to decrypt the encrypted session key being received by the second receiving module so as to obtain the session key and uses the session key being obtained to decrypt the first encrypted data in the second receiving module so as to obtain the second plaintext data, and uses the reading key being generated by the second generating module or the reading key being received by the second receiving module to encrypt the second plaintext data so as to obtain the second encrypted data.

19. The system of accessing to e-book data of claim 15, wherein the reading key being generated by the third generating module is preset or generated randomly, and the reading key is a symmetrical or an unsymmetrical key.

20. The system of accessing to e-book data of claim 15, wherein the third accessing module is used for reading the hardware serial number of the electronic device.

* * * * *